(12) United States Patent  
Ramsayer et al.

(10) Patent No.: US 6,985,961 B1  
(45) Date of Patent: Jan. 10, 2006

(54) SYSTEM FOR ROUTING INCOMING MESSAGE TO VARIOUS DEVICES BASED ON MEDIA CAPABILITIES AND TYPE OF MEDIA SESSION

(75) Inventors: Christopher G. Ramsayer, Apex, NC (US); Philip John Campion, Apex, NC (US); Jeong Min Kim, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 678 days.

(21) Appl. No.: 10/006,942

(22) Filed: Dec. 4, 2001

(51) Int. Cl.  
*G06F 15/173* (2006.01)

(52) U.S. Cl. .................................. 709/238; 709/242

(58) Field of Classification Search ................ 709/231, 709/232, 246, 238–243; 370/351–421  
See application file for complete search history.

(56) References Cited

U.S. PATENT DOCUMENTS

| | | | | |
|---|---|---|---|---|
| 5,519,640 A | * | 5/1996 | Ganesan et al. ............ | 709/236 |
| 5,590,127 A | * | 12/1996 | Bales et al. ................. | 370/260 |
| 5,812,865 A | * | 9/1998 | Theimer et al. ............ | 709/228 |
| 5,920,705 A | * | 7/1999 | Lyon et al. ................. | 709/240 |
| 5,956,482 A | * | 9/1999 | Agraharam et al. ........ | 709/203 |
| 6,496,860 B2 | * | 12/2002 | Ludtke et al. .............. | 709/223 |
| 6,594,699 B1 | * | 7/2003 | Sahai et al. ................ | 709/228 |
| 6,725,264 B1 | * | 4/2004 | Christy ...................... | 709/225 |
| 2002/0178227 A1 | * | 11/2002 | Matsa et al. ................ | 709/206 |

* cited by examiner

*Primary Examiner*—Krisna Lim  
(74) *Attorney, Agent, or Firm*—Withrow & Terranova, PLLC

(57) ABSTRACT

The present invention relates to a composite user agent acting on behalf of a group of member user agents in a communication network. The composite user agent provides its group of member user agents with a specialized proxy function while representing the group to the network as a single user agent. To devices on the communication network, the composite user agent behaves and is viewed as a user agent. To the group of member user agents, the composite user agent behaves and is viewed as both a registrar and a proxy server.

29 Claims, 7 Drawing Sheets

SYSTEM FOR ROUTING INCOMING MESSAGE TO VARIOUS DEVICES BASED ON MEDIA CAPABILITIES AND TYPE OF MEDIA SESSION

FIELD OF THE INVENTION

The present invention relates to controlling packet-switched media sessions, and in particular, relates to a composite user agent for controlling media sessions based on device capability for an associated group of devices.

BACKGROUND OF THE INVENTION

The evolution of packet-switched communications now allows various types of media to be communicated over a common network to devices capable of receiving and processing compatible media. Currently, there exists an eclectic offering of devices capable of supporting data, audio, video media, alone or any combination thereof. For example, a personal computer may support all three types of media, whereas a video device may support only video media, a packet-switched telephone may support only audio media, and a personal digital assistant (PDA) may support voice and data. In essence, there are numerous devices having a mixed array of media capabilities.

In an effort to maximize the benefit of having these various media capabilities, users often have a number of devices with various media capabilities. Further, users may have more than one device with a common media capability, but may have a preference of one device over another for a given media capability, depending on quality, venue, or time of communication. Unfortunately, there is no efficient way for a user to manage communications using the various devices in light of their respective media capabilities. To establish a video session between a personal computer and another video device, the user must establish the video session, and if a related audio session should be created between the personal computer and an audio device, the user must control the establishment of a session between the personal computer and the audio device. In order to establish the separate audio and video sessions, the user must establish the respective sessions as if they were unrelated.

As such, there is a need for a way to efficiently manage multiple devices having various media capabilities. There is a further need to automate the establishment of various sessions based on the type of media and the capability of the respective devices. Where multiple devices have a common capability, there is a need for an efficient and automated way to select a preferred one of the devices to establish a media session.

SUMMARY OF THE INVENTION

The present invention relates to a composite user agent acting on behalf of a group of member user agents in a communication network. The composite user agent provides its group of member user agents with a specialized proxy function while representing the group to the network as a single user agent. To devices on the communication network, the composite user agent behaves and is viewed as a user agent. To the group of member user agents, the composite user agent behaves and is viewed as both a registrar and a proxy server.

Although the composite user agent understands the make-up of the group of member user agents, the member user agents need not have knowledge of each other or that they are being represented by the composite user agent to non-member devices. The composite user agent is configured to route incoming messages to one or more of the member user agents based on the capabilities of each of the particular member user agents. A user may configure the composite user agent to establish preferences or priorities for handling media or establishing sessions amongst the member devices.

Preferably, communications are facilitated using the Session Initiation Protocol (SIP) in accordance with the Internet Engineering Task Force's RFC 254:3: Session Initiation Protocol Internet Draft. As such, the member user agents act as typical user agents in a SIP environment and register with and are represented by the composite user agent. The composite user agent acts as a SIP proxy for the member user agents and represents the group of member user agents to network devices as a single SIP user agent.

In one embodiment, all member user agents register with the composite user agent prior to communications. The composite user agent will then register with a SIP proxy to provide an address or addresses to reach the user. After registration with the SIP proxy, all incoming SIP requests from the network are directed to the composite user agent before being passed to the appropriate member user agent. The member user agents locally configure themselves to send all SIP requests to the composite user agent. As noted, from the viewpoint of the member agent, the composite user agent will act as a proxy, handling all the responsibilities of a SIP proxy. In most cases, the composite user agent will pass all incoming SIP requests from its member user agents to the SIP proxy.

A user using a composite user agent initiates the session with another user by initiating an INVITE request from any of the member user agents. The INVITE message is addressed to the other user. The request is first sent to the composite user agent, since all member user agents have been configured to do so. The composite user agent will then forward the INVITE to the SIP proxy intact, except that the FROM and VIA headers will be altered to contain the SIP address of the composite user agent instead of the SIP address of the member user agent. Modifying these headers essentially hides the member user agent's address and ensures that subsequent request messages from the other user are sent to the composite user agent.

The composite user agent first receives any incoming INVITE request to a user since the composite user agent registered the public address of the user with the SIP proxy. The composite user agent will then determine which member user agent to forward the request to based on the content type found in the request. In forwarding the INVITE to the member user agent, the composite user agent can choose to rewrite the request, or leave the request intact as a proxy would, and simply add itself to the VIA header. The composite user agent forwards all outgoing responses received from member user agents to the SIP proxy intact, except that the FROM, CONTACT, and VIA headers are preferably altered to contain the SIP address of the composite user agent instead of the SIP address of the member user agent. Again, header manipulation hides the member user agent's address and ensures that subsequent request messages from the other user are sent to the composite user agent.

A user may add additional capabilities to a session through the existing member user agent, or by adding an additional member user agent to the session. This, is typically done by sending an INVITE request from the new member user agent to the composite user agent. The composite user agent will combine the content description from this INVITE request with the previous INVITE information used in the session to form a new multi-part MIME message body. A new multi-content INVITE is then sent to the other user, and the capabilities exchange process is carried out as would happen if the composite user agent were a single user agent application.

The other user may add a media session by sending an INVITE message to the composite user agent requesting additional media to be added to the session. The composite user agent will determine if an additional member user agent needs to be brought into the session based upon which member user agent is preferred for the requested media type. If the preferred member user agent is the member user agent already active in the session, then the composite user agent basically passes the INVITE message on to that member user agent. Otherwise, the preferred member user agent needs to be brought into the session. This is accomplished by sending an INVITE request to the preferred member user agent containing the content information pertaining to the additional media.

Sessions may be ended by having the composite user agent constrained to forwarding of BYE messages to remaining member user agents or user ancient upon receipt of a BYE message from a particular device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention provides for an application program that acts on behalf of a group of associated devices on a communication network. The application provides its group of devices with a specialized proxy function, while representing the group to the network as a single entity. The application routes incoming messages to the various devices based on the device's media capability. One or more communication sessions may be established via the application between one or more devices based on the type of media session. Although the concepts of the present invention are applicable to various communication environments and related protocols, the present invention is preferably implemented using the Session Initiation Protocol (SIP). The specification for SIP is provided in the Internet Engineering Task Force's RFC 254.3: Session Initiation Protocol Internet Draft, which is incorporated herein by reference in its entirety.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
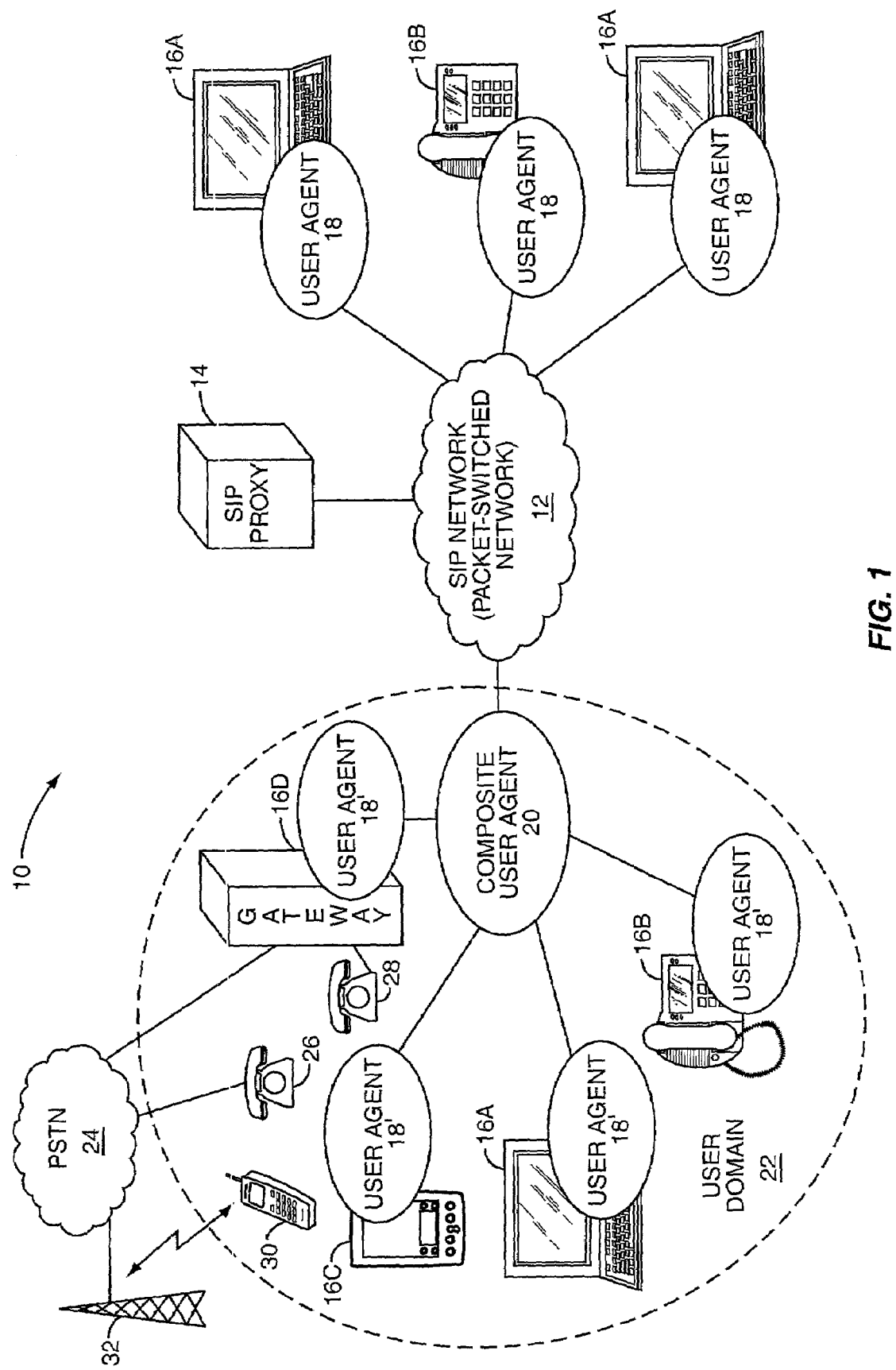
FIG. 1 is a block representation of a communication environment configured according to one embodiment of the present invention.

As illustrated in FIG. 1, a SIP network 12 is implemented over a packet-switched network, and in association with a SIP proxy 14, facilitates media sessions between any number of endpoints 16A–16D. These endpoints may support any one or a combination of data, audio, and voice media sessions, depending on configuration of the device. Although not inclusive, typical endpoints may take the form of a personal computer (PC) 16A, a direct or wireless packet-switched compatible telephone 16B, a PDA 16C, or a gateway 16D capable of supporting any number of telephony devices or providing an interface to other networks, as will be described in more detail below. For clarity, a generic endpoint will be referenced as 16.

A SIP endpoint 16 is capable of running an application, which is typically referred to as a user agent (UA) 18, capable of facilitating media sessions using SIP. User agents 18 register their ability to establish sessions with the SIP proxy 14 by sending "REGISTER" messages to the SIP proxy 14. The register message informs the SIP proxy 14 of the SIP universal resource locator (URL) that: identifies the user agent 18 to the SIP network 12. The register message also contains information about how to reach the specific user agent 18 over the SIP network 12, typically by providing the Internet Protocol (IP) address and port that the user agent 18 will use for SIP sessions.

Typically, when a user agent 18 wants to establish a session with another user agent 18, the user agent initiating the session will send an "INVITE" message to the SIP proxy 14 and specify the targeted user agent 18 in the "TO" header of the invite message. Identification of the user agent 18 takes the form of a SIP URL. In its simplest form, the URL is represented by "<username>@<domain>," such as "janedoe@nortelnetworks.com." The SIP proxy 14 will use the SIP URL in the "TO" header of the message to determine if the targeted user agent 18 is registered with the SIP proxy 14. Generally, the user name is unique within the name space of the specified domain.

If the targeted user agent 18 has registered with the SIP proxy 14, the SIP proxy 14 will forward the invite message directly to the targeted user agent 18. The targeted user agent 18 will respond with a "200 OK" message, and a session between the respective user agents 18 will be established as per the message exchange required in the SIP specification. Media capabilities are passed between the two user agents 18 of the respective endpoints 16 as parameters embedded with the session setup messages, such as the invite, 200 OK, and acknowledgement (ACK) messages. Media capabilities may be exchanged in other messages, such as the SIP "INFO" message. Media capabilities are typically described using the Session Description Protocol (SDP). Once respective endpoints 16 are in an active session with each other and they have determined each others capabilities, the specified media content may be exchanged during an appropriate media session.

According to the Internet Engineering Task Force's RFC 2543, a user agent is an application that contains both a user agent client and a user agent server. A user agent client generally refers to a client application that initiates SIP REQUESTs, whereas a user agent server is an application that contacts the user when a SIP REQUEST is received, and returns a response on behalf of the user. Typically, the response accepts, rejects, or redirects the received REQUEST.

The present invention provides for a composite user agent 20, which is an application program that acts on behalf of a group of user agents 18, designated as member user agents 18'. The composite user agent 20 provides its group of member user agents 18' with a specialized proxy function while representing the group to other user agents 18 over the SIP network 12 as a single user agent 18. A member user agent 18' is a traditional user agent 18 that has registered with and is being represented by the composite user agent 20.

Preferably, to user agents 18 over the SIP network 12, the composite user agent 20 behaves and is viewed as a user agent 18 as specified in the SIP RFC 2543. Other user agents 18 interacting with the composite user agent 20 need not have knowledge of the individual member user agents 18' represented by the composite user agent 20. The composite user agent 20 and the associated endpoints 16 implementing the member user agents 18' form a user domain 22.

To the member user agents 18', the composite user agent 20 behaves and is viewed as both a registrar and a proxy server, as specified in Internet Engineering Task Force's RFC 2534. The composite user agent 20 is aware of the member user agents 18' within the user domain 22; however, the member user agents 18' need not be aware of each other, even when two or more of the member user agents 18' are involved in associated multimedia sessions. Preferably, the composite user agent 20 is configured to route incoming SIP REQUESTs to one or more of the member user agents 18' based on the capabilities of the respective member user agents 18'.

In one embodiment, there is no need to modify the SIP specifications as implemented by the member user agents 18', traditional user agents 18, or the SIP proxy 14. As such, the present invention specifies a new composite user agent 20 having a role different from the roles already defined in RFC 2543, but uses the guidelines set forth therein. Because the composite user agent 20 is viewed by devices with which it interfaces as either a user agent 18 or a proxy server 14, which are both existing SIP roles, the composite user agent 20 is compatible with all existing products that follow the SIP specification.

Continuing with FIG. 1, various types of media sessions may be established through numerous devices. As noted, these sessions may be facilitated through direct or wireless packet-switched networks using IP, Wireless Application Protocol (WAP), and the like. Communications extending to other networks may be facilitated through a gateway 16D, which also runs an application implementing a member user agent 18'. The gateway 16D may be configured to facilitate communications between the SIP network 12 and a disparate network, such as the public switched telephone network (PSTN) 24. As such, audio and data communications may be facilitated through devices supported by the PSTN 24, such as telephony device 26. Alternatively, the gateway 16D may directly support one or more telephony devices 28. Typically, these telephony devices 26, 28 incorporate circuit-switched communications, wherein the gateway 16D must be configured to translated between packet- and circuit-switched communications. Notably, the PSTN 24 may support, include, or otherwise be associated with wireless communication networks facilitating circuit-switched communications. These wireless circuit-switched networks facilitate communications with mobile terminal 30, such as wireless telephones and PDAs, through base stations 32 in traditional fashion.

Initially, all member user agents 18' within the user domain 22 that wish to be represented by the composite user agent 20 must register with the composite user agent 20. As such, each member user agent 18' may send a registration message to the composite user agent 20, or the composite user agent 20 may be configured with registration data corresponding to each member user agent 18'. Independent of the registration of the member user agents 18', the composite user agent 20 should register with the proxy server 14 to provide the various addresses corresponding to the member user agents 18' within the user domain 22. Once registration is complete, all incoming SIP REQUESTs from the SIP network 14 are directed to the composite user agent 20 before being passed to the appropriate member user agents 18'. Also note that a member user agent 18A' or 18B' that has registered with the composite user agent 20A may also register with the SIP proxy 14 using another address. This allows the composite user agent 20A to be bypassed when desired.

All member user agents 18' are configured to send SIP REQUESTs to the composite user agent 20. From the viewpoint of the member user agents 18', the composite user agent 20 acts as a proxy handling all the traditional responsibilities of a traditional SIP proxy server. In most cases, the composite user agent 20 will pass all incoming SIP REQUESTs from its member user agents 18' to the SIP proxy 14; however, it may be desirable for the composite user agent 20 to send SIP REQUESTs directly to a remote user agent 18 using a corresponding SIP URL, if such capability is desired.

The composite user agent 20 is differentiated from a traditional SIP proxy 14 in that it can be configured to route REQUESTs to one or more of its member user agents 18' based upon capabilities of the respective member user agents 18'. Traditionally, a SIP proxy 14 has the ability to fork REQUESTs when more than one user agent 18 is registered using the same address, but the choice is to either send the request to all, such as a multicast session, or to just one, such as a unicast session, wherein the decision is made independent of the capabilities of each user agent 18. The composite user agent 20 is different, in that it examines content information of SIP messages, such as incoming INVITE messages, and routes the message to the preferred member user agent 18' that handles the media type specified in the message. If more than one media type is requested, the composite user agent 20 may route the message to each member user agent 18' that is preferred for each media type.

When the user domain 22 includes member user agents 18' supporting common media types, various types of profiles and preferences may be defined in the composite user agent 20. The profiles and preferences may dictate selection of a member user agent 18' based on priority, timing, availability, and the like. For example, a first of two member user agents 18' supporting a common media type may be selected during normal work hours, while the other may be selected during non-work hours. The profiles or preferences may also make these selections based on the need for additional media capabilities or the source of incoming media. Those skilled in the art will recognize numerous variations and combinations for such profiles and preferences.

The manner in which the composite user agent 20 determined which member user agent 18' is preferred for each media type is a matter of implementation. The preferences or profiles can be provisioned on each composite user agent 20, or the composite user agent 20 could query the capabilities of each member user agent 18' using SIP "OPTIONS" message. If the composite user agent 20 receives an INVITE message with a media type that is not supported by any of its member user agents 18', the composite user agent 20 could respond with a "415 UNSUPPORTED MEDIA TYPE" message.

Figure 2:
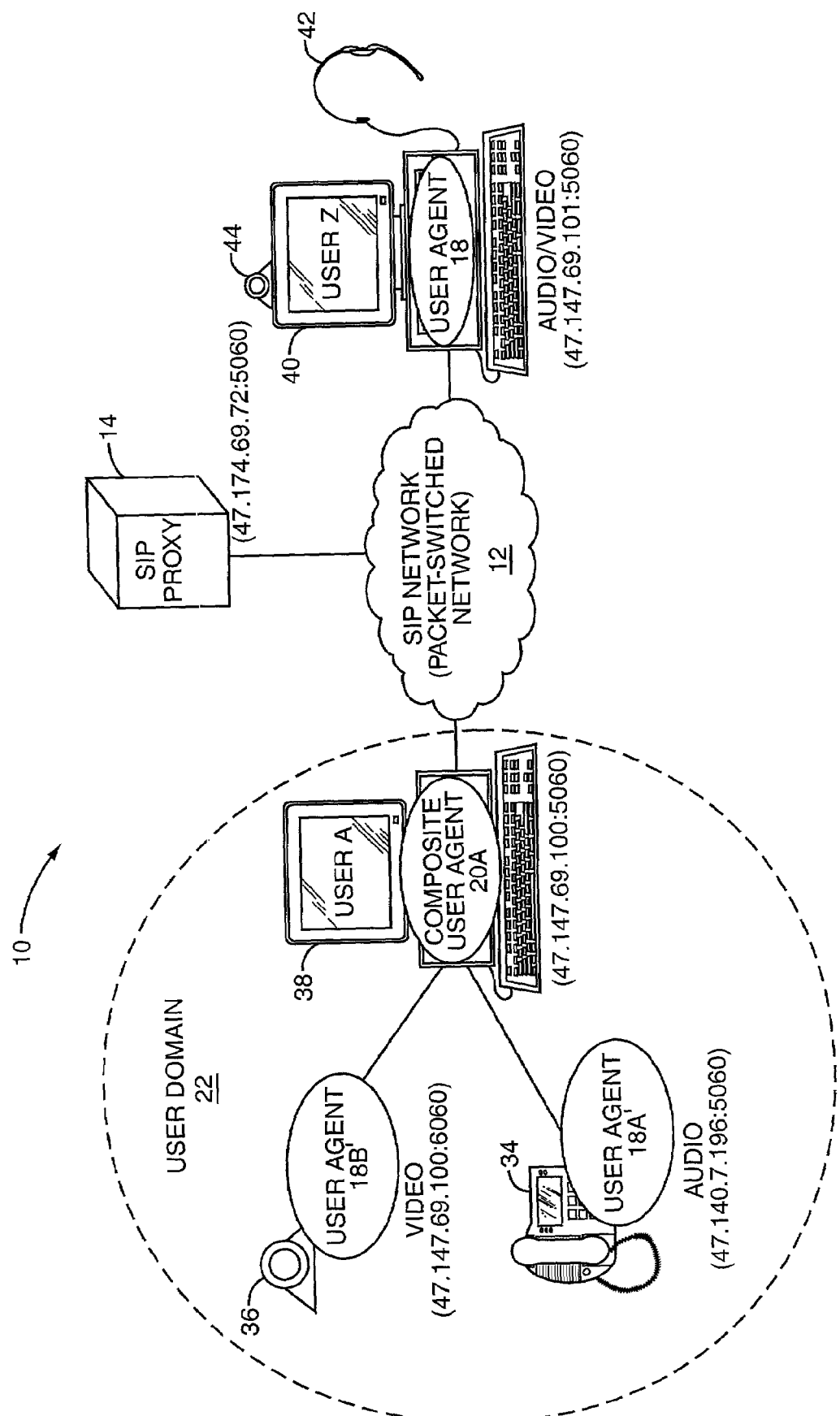
FIG. 2 is a simplified communication environment for an exemplary embodiment of the present invention.

Several exemplary illustrations follow in view of the communication environment 10 illustrated in FIG. 2. As illustrated, a composite system 38, which represents, any type of computing device, is used to implement the composite user agent 20A, and includes the URL and port: 47.147.69.100:5060. The composite system 38 forms the user domain 22 with two endpoints 16: an audio device 34 implementing a member user agent 18A', and a video device 36 implementing a member user agent 18B'. The audio device 34 has an address and port number 47.140.7.196: 5060, and the video device 36 has a URL and port number 47.147.69.100:6060. As described above, the user agents 18A' and 18B' for the respective audio device 34 and video device 36 have registered with the composite user agent 20A of composite system 38. The user associated with the user domain 22 and the composite user agent 20A is user A.

Given the configuration of FIG. 2, the user domain 22 for user A has audio capability through audio device 34 and video capability through video device 36. In the illustrated embodiment, the video device 36 is a video camera running on composite system 38, which is a personal computer. The composite user agent 20A recognizes the respective devices and their capabilities, and has registered with the SIP proxy 14 as a single user agent on behalf of both audio device 34 and video device 36.

Assume that user A of the user domain 22 desires to participate in a media session requiring audio and video capabilities with user Z, which has an audio/video device 40, such as a multimedia personal computer having an audio device 42 find video device 44. The audio/video device 40 can facilitate audio and video sessions via the address and port 47.147.69.101:5060. The address and port for the SIP proxy 14 is 47.174.69.72:5060.

From the perspective of the SIP proxy 14 and the user agent 18 running on the audio/video device 40, the media session with user A must be established with the composite user agent 20A of the composite system 38 as if it were a traditional endpoint and user agent.

Figure 3:
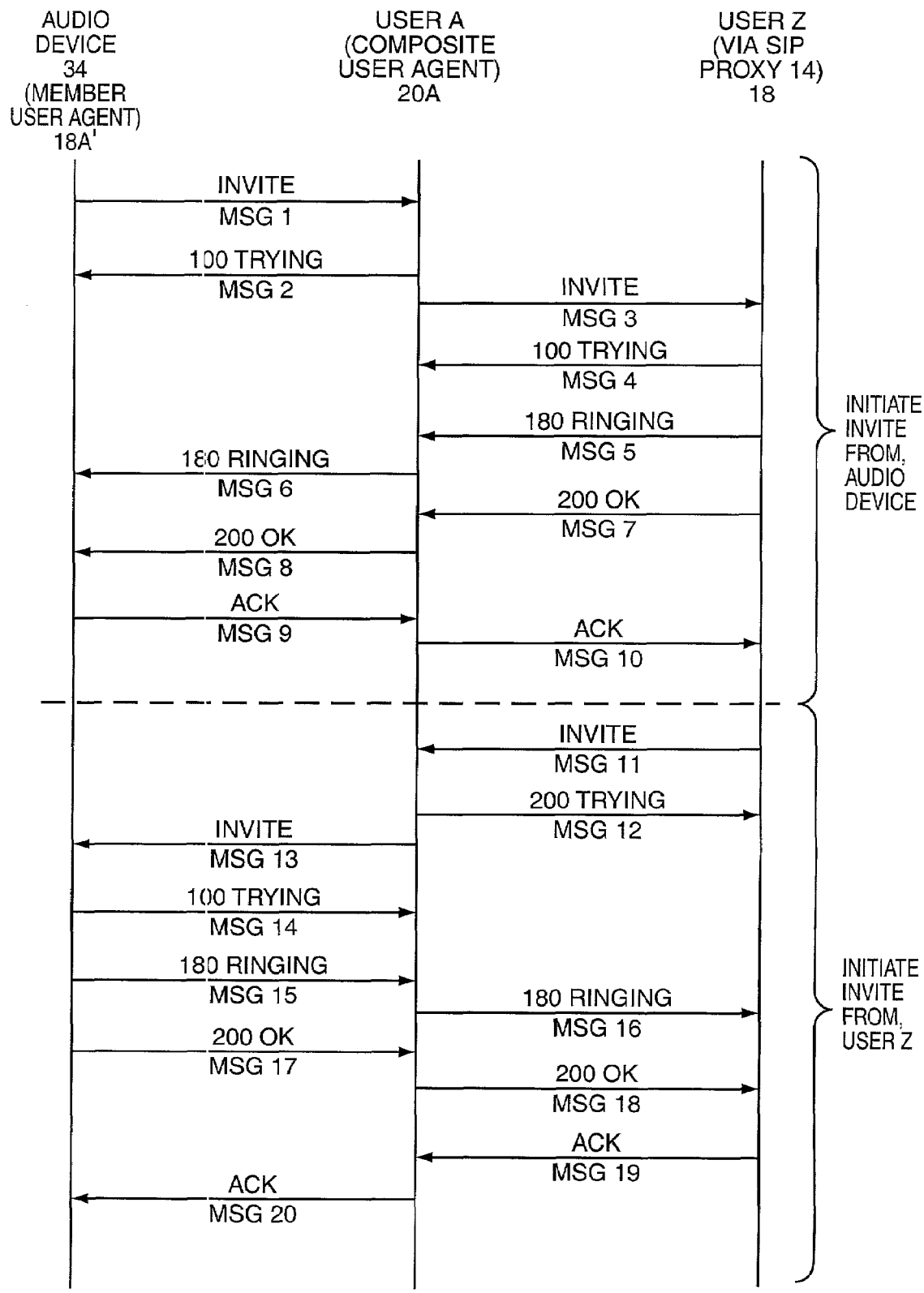
FIG. 3 is a communication flow diagram outlining sending and receiving an "INVITE" request according to a preferred embodiment of the present invention.

An exemplary communication flow in light of the communication environment 10 of FIG. 2 for initiating an audio session from audio device 34 is shown in FIG. 3. For user A to initiate an audio session with user Z using audio device 34, the composite user agent 20A will initiate a session with user agent 18 by initiating an INVITE message from member user agent 18A'. The INVITE message is addressed to user agent 18 for user Z's audio/video device 40. The INVITE message is first sent to the composite user agent 20A (message 1). In response, the composite user agent 20A will send a 100 TRYING message to the member user agent 18A' (message 2), as well as forward the INVITE message to the SIP proxy 14 (message 3), substantially intact with the exception that the FROM and VIA headers will be altered to contain the SIP address of the composite user agent 20A instead of the SIP address for the member user agent 18A'. Changing the headers hides the member user agent's address and ensures that subsequent messages from other user agents 18 are sent to the composite user agent 20A. The SIP proxy 14 will forward the INVITE to the user agent 18 for user Z. For the rest of the description, various messages sent between the composite user agent 20A and user agent 18 of user Z are sent back and forth via the SIP proxy 14.

In response to forwarding the INVITE message to user Z via the SIP proxy 14, the composite user agent 20A will receive a 100 TRYING (message 4) and a 180 RINGING (message 5). In response, the composite user agent 20A will send a 180 RINGING (message 6) to the member user agent 18A'.

Meanwhile, a 200 OK (message 7) is sent to the composite user agent 20A from user Z via the SIP proxy 14, wherein the composite user agent 20A will forward the 200 OK (message 8) to the member user agent 18A'. In response, the member user agent 18A' will provide an ACK (message 9) to the composite user agent 20A, which will forward it to user Z via the SIP proxy 14 (message 10). At this point, a media session is established for audio between the audio device 34 and the audio/video device 40.

Exemplary messages for messages 1–10 are shown in Example 1 from the viewpoint of the composite user agent 20A:

EXAMPLE 1

| | |
|---|---|
| Message 1> | INVITE sip: userZ@publicAddress.com SIP/2.0 |
| | Via: SIP/2.0/UDP 47.140.7.196:5060 |
| | From: Device A <sip: deviceA@47.140.7.196:5060> |
| | To: User Z <sip: userZ@publicAddress.com> |
| | Call-ID: 3498575938@47.140.7.196 |
| | Cseq: 1 INVITE |
| | Content-Type: application/sdp |
| | Content-Length: . . . |
| Message 2> | SIP/2.0 100 Trying |
| | Via: SIP/2.0/UDP 47.147.69.100:5060 |
| | From: Device A <sip: deviceA@47.140.7.196:5060> |
| | To: User Z <sip: userZ@publicAddress.com> |
| | Call-ID: 3498575938@47.140.7.196 |
| | Cseq: 1 INVITE |
| | Content-Length: 0 |
| Message 3> | INVITE sip:userZ@publicAddress.com SIP/2.0 |
| | Via: SIP/2.0/UDP 47.147.69.100:5060 |
| | From: User A <sip:userA@publicAddress.com> |
| | To: User Z <sip:userZ@publicAddress.com> |
| | Call-ID: 892934772@47.147.69.100 |
| | Cseq: 1 INVITE |
| | Content-Type: application/sdp |
| | ConLent-Length: . . . |
| Message 4> | SIP/2.0 100 Trying |
| | Via: SIP/2.0/UDP 47.147.69.72:5060 |
| | Via: SIP/2.0/UDP 47.147.69.101:5060 |
| | From: User A <sip:userA@publicAddress.com> |
| | To: User Z <sip:userZ@publicAddress.com> |
| | Call-ID: 892934772@47.147.69.100 |
| | Cseq: 1 INVITE |
| | Content-Length: 0 |
| Message 5> | SIP/2.0 180 Ringing |
| | Via: SIP/2.0/UDP 47.147.69.72:5060 |
| | Via: SIP/2.0/UDP 47.147.69.101:5060 |
| | From: User A <sip:userA@publicAddress.com> |

-continued

Message 6>
```
     To: User Z <sip:userZ@publicAddress.com>
     Call-ID: 892934772@47.147.69.100
     Cseq: 1 INVITE
     Content-Length: 0
     SIP/2.0 180 Ringing
     Via: SIP/2.0/UDP 47.147.69.100:5060
     From: Device A <sip:deviceA@47.140.7.196:5060>
     To: User Z <sip:userZ@publicAddress.com>
     Call-ID: 3498575938@47.140.7.196
     Cseq: 1 INVITE
     Content-Length: 0
```
Message 7>
```
     SIP/2.0 200 OK
     Via: SIP/2.0/UDP 47.147.69.72:5060
     Via: SIP/2.0/UDP 47.147.69.101:5060
     From: User A <sip:userA@publicAddress.com>
     To: User Z <sip:userZ@publicAddress.com>
     Call-ID: 892934772@47.147.69.100
     Cseq: 1 INVITE
     Contact: sip: userZ@contactAddress
     Content-Type: application/sdp
     Content-Length: . . .
```
Message 8>
```
     SIP/2.0 200 OK
     Via: SIP/2.0/UDP 47.147.69.100:5060
     From: Device A <sip:deviceA@47.140.7.196:5060>
     To: User Z <sip:userZ@publicAddress.com>
     Call-ID: 3498575938@47.140.7.196
     Cseq: 1 INVITE
     Contact: sip: userA@contactAddress
     Content-Type: application/sdp
     Content-Length: . . .
```
Message 9>
```
     ACK sip:userA@contactAddress SIP/2.0
     Via: SIP/2.0/UDP 47.140.7.196:5060
     From: Device A <sip:deviceA@47.140.7.196:5060>
     To: User Z <sip:userZ@publicAddress.com>
     Call-ID: 3498575938@47.140.7.196
     Cseq: 1 ACK
```
Message 10>
```
     ACK sip:userZ@contactAddress SIP/2.0
     Via: SIP/2.0/UDP 47.147.69.100:5060
     From: User A <sip:userA@publicAddress.com>
     To: User Z <sip:userZ@publicAddress.com>
     Call-ID: 892934772@47.147.69.100
     Cseq: 1 ACK
```

Continuing with FIG. 3, the process of receiving an INVITE message for a device within the user domain 22 is illustrated. Since the composite user agent 20A registered the public address of the user with the SIP proxy 14, the composite user agent 20A will receive any incoming INVITE messages originating from user agent 18 of user Z (message 11). The composite user agent 20A will then send a 200 TRYING message to the user agent 18 via the SIP proxy 14 (message 12). The composite user agent 20A will determine which member user agent 18A' or 18B' to forward the request based upon the media type identified in the INVITE message. Further, the composite user agent 20A will forward the INVITE message to member user agent 18A' (message 13). In forwarding the INVITE message to the member user agent 18A', the composite user agent 20A can choose to rewrite the message, for example alter the TO, VIA, and CALL ID headers, or leave the message intact as the SIP proxy 14 would, and simply add itself to the VIA header. The composite user agent 20A forwards all outgoing responses received from the respective member user agents 18A' or 18B' to the SIP proxy 14 intact, except that the FROM, CONTACT, and VIA headers may be altered to contain the SIP address of the composite user agent 20A instead of the SIP address For the member user agent 18A' or 18B'. As noted above, changing these headers essentially hides the member user agent's address and ensures that subsequent INVITE messages from the user agent 18 are sent to the composite user agent 20A.

Continuing with FIG. 3, the member user agent 18A' will respond to the forwarded INVITE message by sending a 100 TRYING (message 14) and a 180 RINGING (message 15) to the composite user agent 20A. The composite user agent 20A will forward the 180 RINGING (message 16) to the user agent 18 via the SIP proxy 14. The member user agent 18A' will also send a 200 OK (message 17) to the composite user agent 20A for forwarding to the user agent 18 via the SIP proxy 14 (message 18). In response, the user agent 18 will send an ACK (message 19) via the SIP proxy 14 to the composite user agent 20A, which will further forward the ACK message to the member user agent 18A' (message 20). At this point, user Z has initiated and established a session with the audio device 34 in the user domain 22. Notably, user Z did not have to select or identify the appropriate device having audio capability. Instead, the composite user agent 20A essentially represented itself as a device having audio capability on behalf of the audio device 34 and establishment of the media session occurred automatically. Exemplary messages for messages 11–20 are provided in Example 2 from the viewpoint of the composite user agent 20A.

EXAMPLE 2

Message 11>
```
     INVITE sip:userA@47.147.69.100:5060 SIP/2.0
     Via: SIP/2.0/UDP 47.147.69.72:5060
     Via: SIP/2.0/UDP 47.147.69.101:5060
     From: User Z <sip:userZ@publicAddress.com>
     To: User A <sip:userA@publicAddress.com>
     Call-ID: 1164739291@47.147.69.101
     Cseq: 1 INVITE
     Content-Type: application/sdp
     Content-Length: . . .
```
Message 12>
```
     SIP/2.0 100 Trying
     Via: SIP/2.0/UDP 47.147.69.100:5060
     From: User Z <sip:userZ@publicAddress.com>
     To: user A <sip:userA@publicAddress.com>
     Call-ID: 1164739291@47.147.69.101
     Cseq: 1 INVITE
     Content-Length: 0
```
Message 13>
```
     INVITE sip:deviceA@47.140.7.196:5060 SIP/2.0
     Via: SIP/2.0/UDP 47.147.69.100:5060
     From: User A <sip:userA@47.147.69.100:5060>
     To: Device A <sip:deviceA@47.140.7.196:5060>
     Call-ID: 52645349853@47.147.69.100
     Cseq: 1 INVITE
     Content-Type: application/sdp
     Content-Length: . . .
```
Message 14>
```
     SIP/2.0 100 Trying
     Via: SIP/2.0/UDP 47.140.7.196:5060
     From: User A <sip:userA@47.147.69.100:5060>
     To: Device A <sip:deviceA@47.140.7.196:5060>
     Call-ID: 52645349853@47.147.69.100
     Cseq: 1 INVITE
     Content-Length: 0
```
Message 15>
```
     SIP/2.0 180 Ringing
     Via: SIP/2.0/UDP 47.140.7.196:5060
     From: User A <sip:userA@47.147.69.100:5060>
     To: Device A <sip:deviceA@47.140.7.196:5060>
     Call-ID: 52645349853@47.147.69.100
     Cseq: 1 INVITE
     Content-Length: 0
```
Message 16>
```
     SIP/2.0 180 Ringing
     Via: SIP/2.0/UDP 47.147.69.100:5060
     From: User Z <sip:userZ@publicAddress.com>
     To: User A <sip:userA@publicAddress.com>
     Call-ID: 1164739291@47.147.69.101
     Cseq: 1 INVITE
     Content-Length: 0
```

-continued

| | |
|---|---|
| Message 17> | SIP/2.0 200 OK<br>Via: SIP/2.0/UDP 47.140.7.196:5060<br>From: User A <sip:userA@47.147.69.100:5060><br>To: Device A <sip:deviceA@47.140.7.196:5060><br>Call-ID: 52645349853@47.147.69.100<br>Cseq: 1 INVITE<br>Contact: sip:deviceA@contactAddress<br>Content-Type: application/sdp<br>Content-Length: . . . |
| Message 18> | SIP/2.0 200 OK<br>Via: SIP/2.0/UDP 47.147.69.100:5060<br>From: User Z <sip:userZ@publicAddress.com><br>To: User A <sip:userA@publicAddress.com><br>Call-ID: 1164739291@47.147.69.101<br>Cseq: 1 INVITE<br>Contact: sip: userA@contactAddress<br>Content-Type: application/sdp<br>Content-Length: . . . |
| Message 19> | ACK sip: userA@contactAddress SIP/2.0<br>Via: SIP/2.0/UDP 47.147.69.72:5060<br>Via: SIP/2.0/UDP 47.147.69.101:5060<br>From: User Z <sip:userZ@publicAddress.com><br>To: User A <sip:userA@publicAddress.com><br>Call-ID: 1164739291@47.147.69.101<br>Cseq: 1 ACK |
| Message 20> | ACK sip:deviceA@contactAddress SIP/2.0<br>Via: SIP/2.0/UDP 47.147.69.100:5060<br>From: User A <sip:userA@47.147.69.100:5060><br>To: Device A <sip:deviceA@47.140.7.196:5060><br>Call-ID: 52645349853@47.147.69.100<br>Cseq: 1 ACK |

Figure 4:
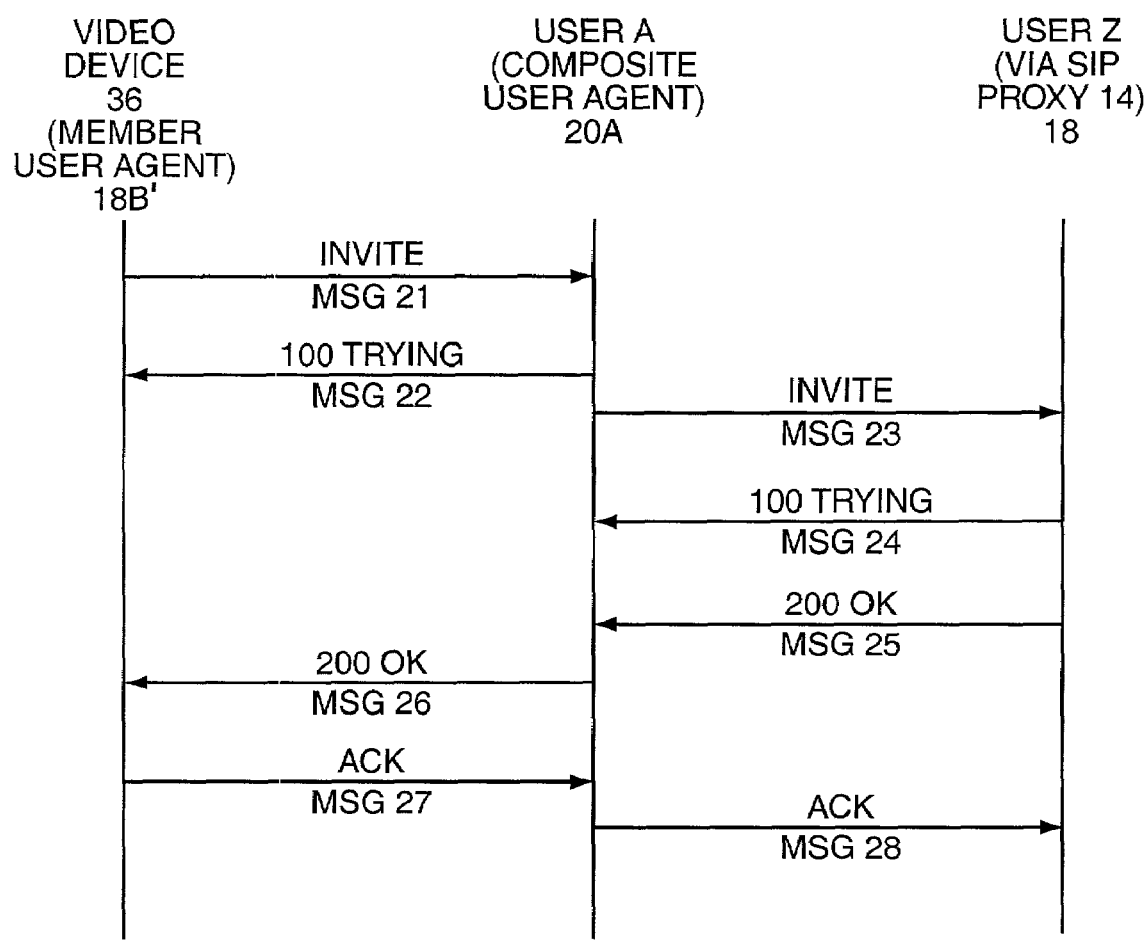
FIG. 4 is a communication flow diagram outlining the addition of a member user agent to a session by the primary user according to a preferred embodiment of the present invention.

FIG. 4 illustrates an exemplary process for adding member user agent 18A' to an existing session when initiated by user A. Assume that an audio session is established as outlined in messages 1–10 in FIG. 3.

In any SIP peer-to-peer session, participating user agents may change or add additional capabilities to a session. When using a composite user agent 20A, a user may add additional capabilities to the session through an existing member user agent 18' or by adding an additional member user agent 18' to the session. This may be done by sending an INVITE message from the new member user agent 18B' to the composite user agent 20A (message 21). Ir response, the composite user agent 20A will reply with a 100 TRYING (message 22) as well as combine the content description from the INVITE (message 21) with the previous INVITE information used to establish the original session (message 1, FIG. 3) to form a new multi-part MIME message body.

MIME defines a technique whereby an object can contain a reference or pointer to data rather than having to contain the data itself. This system is embodied in the text/uri-list media type defined in the Internet Engineering Task Force's RFC1521, which is incorporated herein by reference in its entirety. In essence, MIME is a defined way to label items to make them more amenable to correct handling. The composite user agent 20A then sends the multi-content INVITE (message 23) to user agent 18 via SIP proxy 14 and the capabilities exchange process is carried out as if the composite user agent 20A were a single user agent 18. The only difference is that the composite user agent 20A must separate and route the appropriate Session Description Protocol (SDP) information to and from each member user agent 18A', 18B'.

In response, a 200 OK (message 25) is sent to the composite user agent 20A and forwarded to member user agent 18B' (message 26), which will respond with an ACK (message 27) to the composite user agent 20A. The composite user agent 20A forwards the ACK (message 28) to the user agent 18 via the SIP proxy 14. Exemplary messages for messages 21–28 are provided in Example 3 from the viewpoint of the composite user agent 20A.

EXAMPLE 3

| | |
|---|---|
| Message 21> | INVITE sip:userZ@publicAddress.com SIP/2.0<br>Via: SIP/2.0/UDP 47.147.69.100:6060<br>From: Device B <sip:deviceB@47.147.69.100:6060><br>To: User Z <sip:userZ@publicAddress.com><br>Call-ID: 4498575938@47.147.69.100<br>Cseq: 1 INVITE<br>Content-Type: application/sdp<br>Content-Length: . . . |
| Message 22> | SIP/2.0 100 Trying<br>Via: SIP/2.0/UDP 47.147.69.100:5060<br>From: Device B <sip:deviceB@47.147.69.100:6060><br>To: User Z <sip:userZ@publicAddress.com><br>Call-ID: 4498575938@47.147.69.100<br>Cseq: 1 INVITE<br>Content-Length: 0 |
| Message 23> | INVITE sip:userZ@publicAddress.com SIP/2.0<br>Via: SIP/20/UDP 47.147.69.100:5060<br>From: User A <sip:userA@publicAddress.com><br>To: User Z <sip:userZ@publicAddress.com><br>Call-ID: 892934772@47.147.69.100<br>Cseq: 2 INVITE<br>Content-Type: multipart/ . . .<br>Content-Length: . . . |
| Message 24> | SIP/2.0 100 Trying<br>Via: SIP/2.0/UDP 47.147.69.72:5060<br>Via: SIP/2.0/UDP 47.147.69.101:5060<br>From: User A <sip:userA@publicAddress.com><br>To: User Z <sip:userZ@publicAddress.com><br>Call-ID: 892934772@47.147.69.100<br>Cseq: 2 INVITE<br>Content-Length: 0 |
| Message 25> | SIP/2.0 200 OK<br>Via: SIP/2.0/UDP 47.147.69.72:5060<br>Via: SIP/2.0/UDP 47.147.69.101:5060<br>From: User A <sip:userA@publicAddress.com><br>To: User Z <sip:userZ@publicAddress.com><br>Call-ID: 892934772@47.147.69.100<br>Cseq: 2 INVITE<br>Contact: sip: userZ@contactAddress<br>Content-Type: multipart/. . .<br>Content-Length: . . . |
| Message 26> | SIP/2.0 200 OK<br>Via: SIP/2.0/UDP 47.147.69.100:5060<br>From: Device B <sip:deviceB@47.147.69.100:6060><br>To: User Z <sip:userZ@publicAddress.com><br>Call-ID: 4498575938@47.147.69.100<br>Cseq: 1 INVITE<br>Contact: sip: userA@contactAddress<br>Content-Type:application/sdp<br>Content-Length: . . . |
| Message 27> | ACK sip:userA@contactAddress SIP/2.0<br>Via: SIP/2.0/UDP 47.147.69.100:6060<br>From: Device B <sip:deviceB@47.147.69.100:6060><br>To: User Z <sip:userZ@publicAddress.com><br>Call-ID: 4498575938@47.147.69.100<br>Cseq: 1 ACK |
| Message 28> | ACK sip:userZ@contactAddress SIP/2.0<br>Via: SIP/2.0/UDP 47.147.69.100:5060<br>From: User A <sip:userA@publicAddress.com><br>To: User Z <sip:userZ@publicAddress.com><br>Call-ID: 892934772@47.147.69.100<br>Cseq: 2 ACK |

Figure 5:
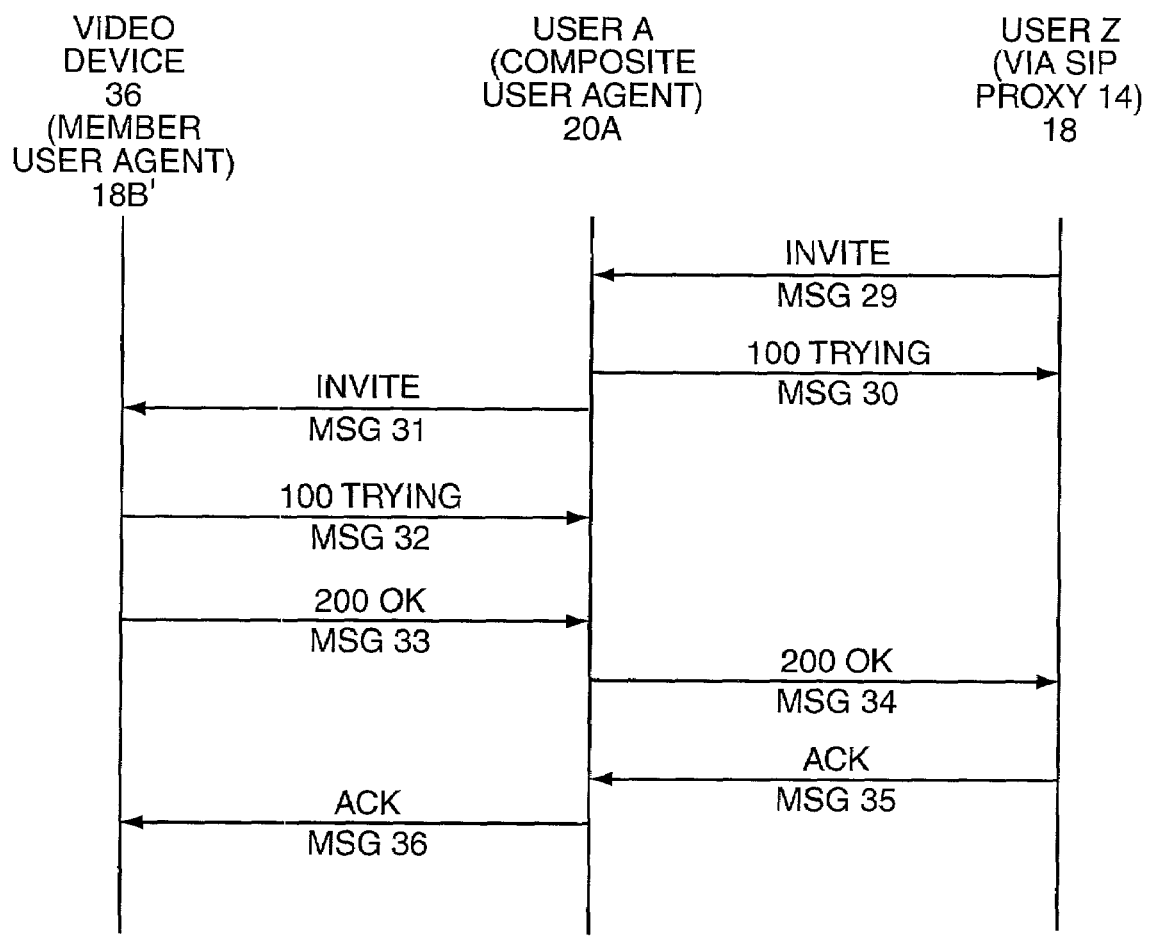
FIG. 5 is a communication flow diagram outlining the addition of a media session by another user according to a preferred embodiment of the present invention.

FIG. 5 illustrates an exemplary process for adding a media session by the user agent 18 via the SIP proxy 14. In the event that a subsequent INVITE message is received by a composite user agent 20A requesting additional media to be added to a session, the composite user agent 20A will determine if an additional member user agent should be brought into the session. The decision is based on the member user agent preferred for the requested media type.

If the preferred member user agent is currently active, the composite user agent 20A essentially passes the INVITE message on to that member user agent. Otherwise, the preferred member user agent must be brought into the session. Assume that an audio session is established as outlined in messages 1–20 in FIG. 3.

Establishing the new media session from another user agent 18 for user Z is initiated by sending an INVITE message to the composite user agent 20A via the SIP proxy 14 (message 29). In response, the composite user agent 20A will reply with a 100 TRYING (message 30) and send an INVITE message to the member user agent 18B' for the video device 36 (message 31). Accord ingly, the member user agent 18B' will send 100 TRYING and 200 OK messages (messages 32 and 33) to the composite user agent 20A. Upon receiving the 200 OK message from the member user agent 18B', the composite user agent 20A will combine the content description from this response with the previous content description used in this session to form a new multipart MIME message body.

A new multi-content 200 OK message (message 34) is then sent to the user agent 183. The capabilities exchange process is carried out as if the composite user agent 20A were a single user agent application. Acknowledgement messages are forwarded through the composite user agent 20A to the member user agent 18B' (messages 35 and 36). The only difference is that the composite user agent 20A must separate and route the appropriate SDP information to and from each member user agent 18A' and 18B'. The example illustrated in FIG. 5 only illustrates exchanging messages with the member user agent 18B' based on the assumption that the SDP information for the existing member user agent 18A' has not changed. Exemplary messages for messages 29–36 are provided in Example 4 from the viewpoint of the composite user agent 20A.

EXAMPLE 4

| | |
|---|---|
| Message 29> | INVITE sip:userA@47.147.69.100:5060 SIP/2.0<br>Via: SIP/2.0/UDP 47.147.69.72:5060<br>Via: SIP/2.0/UDp 47.147.69.101:5060<br>From: User Z <sip:userZ@publicAddress.com><br>To: User A <sip:userA@publicAddress.com><br>Call-ID: 1164739291@47.147.69.101<br>Cseq: 2 INVITE<br>Content-Type:multipart/. . .<br>Content-Length: . . . |
| Message 30> | SIP/2.0 100 Trying<br>Via: SIP/2.0/UDP 47.147.69.100:5060<br>From: User Z <sip:userZ@publicAddress.com><br>To: User A <sip:userA@publicAddress.com><br>Call-ID: 1164739291@47.147.69.101<br>Cseq: 2 INVITE<br>Content-Length: 0 |
| Message 31> | INVITE sip:deviceB@47.140.7.196:6060 SIP/2.0<br>Via: SIP/2.0/UDP 47.147.69.100:5060<br>From: User A <sip:userA@47.147.69.100:5060><br>To: Device B <sip:deviceB@47.140.7.196:6060><br>Call-ID: 62645349853@47.147.69.100<br>Cseq: 1 INVITE<br>Content-Type: application/sdp<br>Content-Length: . . . |
| Message 32> | SIP/2.0 100 Trying<br>Via: SIP/2.0/UDP 47.140.7.196:6060<br>From: User A <sip:userA@47.147.69.100:5060><br>To: Device B <sip:deviceB@47.140.7.196:6060><br>Call-ID: 62645349853@47.147.69.100<br>Cseq: 1 INVITE<br>Content-Length: 0 |

-continued

| | |
|---|---|
| Message 33> | SIP/2.0 200 OK<br>Via: SIP/2.0/UDP 47.140.7.196:6060<br>From: User A <sip:userA@47.147.69.100:5060><br>To: Device B <sip:deviceB@47.140.7.196:6060><br>Call-ID: 62645349853@47.147.69.100<br>Cseq: 1 INVITE<br>Contact: sip:deviceB@contactAddress<br>Content-Type: application/sdp<br>Content-Length: . . . |
| Message 34> | SIP/2.0 200 OK<br>Via: SIP/2.0/UDP 47.147.69.100:5060<br>From: User A <sip:userA@publicAddress.com><br>To: User Z <sip:userZ@publicAddress.com><br>Call-ID: 1164739291@47.147.69.101<br>Cseq: 2 INVITE<br>Contact: sip: userA@contactAddress<br>Content-Type:multipart/. . .<br>Content-Length: . . . |
| Message 35> | ACK sip: userA@contactAddress SIP/2.0<br>Via: SIP/2.0/UDP 47.147.69.72:5060<br>Via: SIP/2.0/UDP 47.147.69.101:5060<br>From: User A <sip:userA@publicAddress.com><br>To: User Z <sip:userZ@publicAddress.com><br>Call-ID: 1164739291@47.147.69.101<br>Cseq: 2 ACK |
| Message 36> | ACK sip:deviceB@contactAddress SIP/2.0<br>Via: SIP/2.0/UDP 47.147.69.100:5060<br>From: User A <sip:userA@47.147.69.100:5060><br>To: Device B <sip:deviceB@47.140.7.196:6060><br>Call-ID: 62645349853@47.147.69.100<br>Cseq: 1 ACK |

Figure 6:
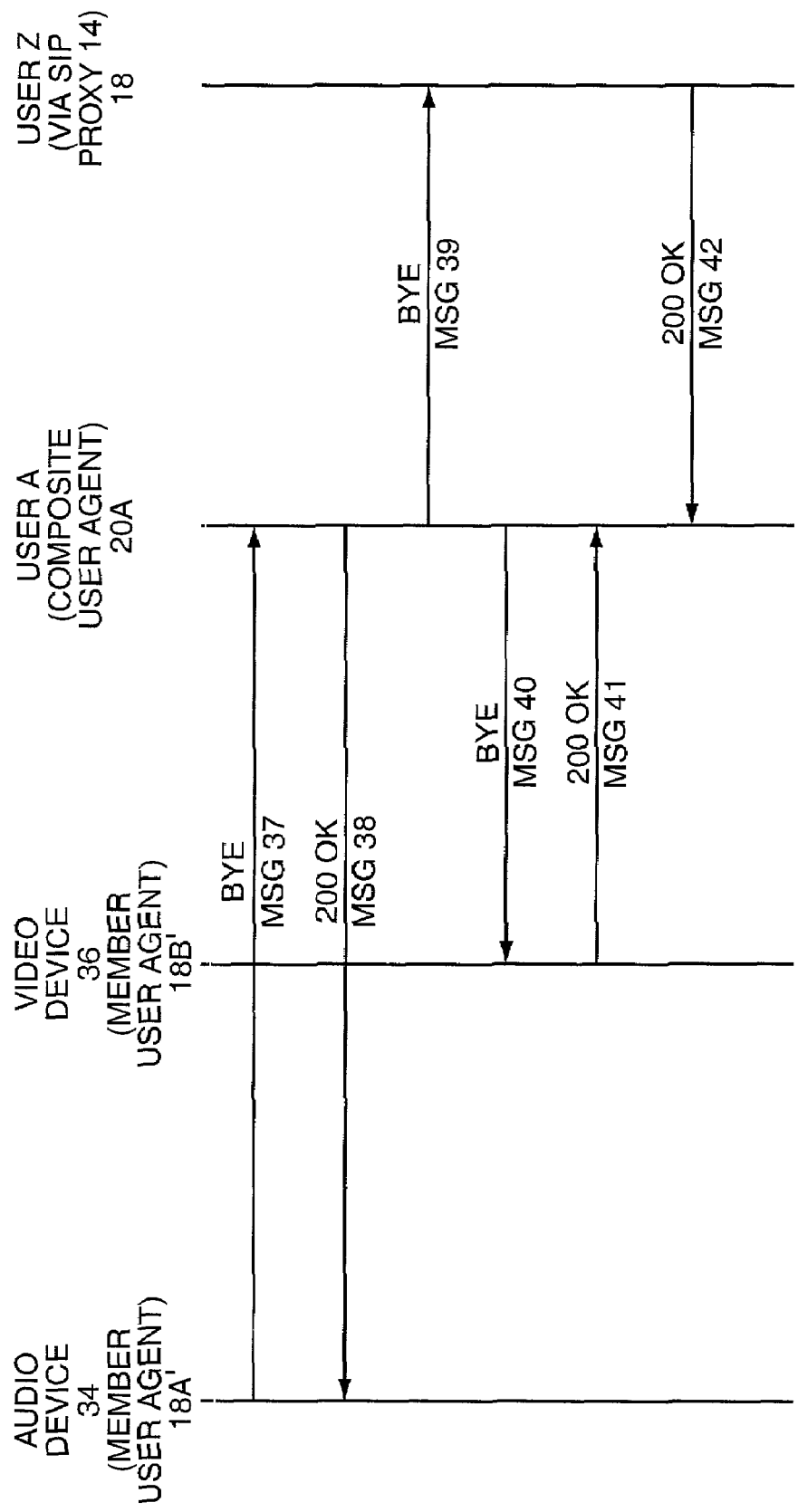
FIG. 6 is a communication flow diagram outlining the process of terminating a call by the user according to a preferred embodiment of the present invention.

An exemplary flow for terminating sessions is outlined in FIG. 6. For user A to end a session, a BYE message may be sent from one of the member user agents, such as member user agent 18A' (message 37), to the composite user agent 20A, which will respond with a 200 OK (message 38). The composite user agent 20A will also send the BYE message 39 to the user agent 18 of user Z via the SIP proxy 14 (message 39), and to other participating member user agents, such as member user agent 18B' (message 40). In response, the member user agent 18B' will send a 200 OK (message 41) to the composite user agent 20A. Meanwhile, the user agent 18 of user Z will send a 200 OK message to the composite user agent 20A (message 42) to finalize the termination of both sessions.

Example 5 shows representative messages for messages 37–42 from the viewpoint of the composite user agent 20A.

EXAMPLE 5

| | |
|---|---|
| Message 37> | BYE sip: userZ@publicAddress.com SIP/2.0<br>Via: SIP/2.0/UDP 47.140.7.196:5060<br>From: Device A <sip: deviceA@47.140.7.196:5060><br>To: User Z <sip: userZ@publicAddress.com><br>Call-ID: 3498575938@47.140.7.196<br>Cseq: 2 BYE |
| Message 38> | SIP/2.0 200 OK<br>Via: SIP/2.0/UDP 47.147.69.100:5060<br>From: Device A <sip:deviceA@47.140.7.196:5060><br>To: User Z <sip:userZ@publicAddress.com><br>Call-ID: 3498575938@47.140.7.196<br>Cseq: 2 BYE |
| Message 39> | BYE sip:userZ@publicAddress.com SIP/2.0<br>Via: SIP/2.0/UDP 47.147.69.100:5060<br>From: User A <sip:userA@publicAddress.com><br>To: User Z <sip:userZ@publicAddress.com><br>Call-ID: 892934772@47.147.69.100<br>Cseq: 3 BYE |

-continued

| | |
|---|---|
| Message 40> | BYE sip:userZ@publicAddress.com SIP/2.0 |
| | Via: SIP/2.0/UDP 47.147.69.100:5060 |
| | From: User Z <sip:userZ@publicAddress.com> |
| | To: Device B <sip:deviceB@47.147.69.100:6060> |
| | Call-ID: 4498575938@47.147.69.100 |
| | Cseq: 2 BYE |
| Message 41> | SIP/2.0 200 OK |
| | Via: SIP/2.0/UDP 47.147.69.100:6060 |
| | From: User Z <sip:userZ@publicAddress.com> |
| | To: Device B <sip:deviceB@47.147.69.100:6060> |
| | Call-ID: 4498575938@47.147.69.100 |
| | Cseq: 2 BYE |
| Message 42> | SIP/2.0 200 OK |
| | Via: SIP/2.0/UDP 47.147.69.72:5060 |
| | Via: SIP/2.0/UDP 47.147.69.101:5060 |
| | From: User A <sip:userA@publicAddress.com> |
| | To: User Z <sip:userZ@publicAddress.com> |
| | Call-ID: 892934772@47.147.69.100 |
| | Cseq: 3 BYE |

Figure 7:
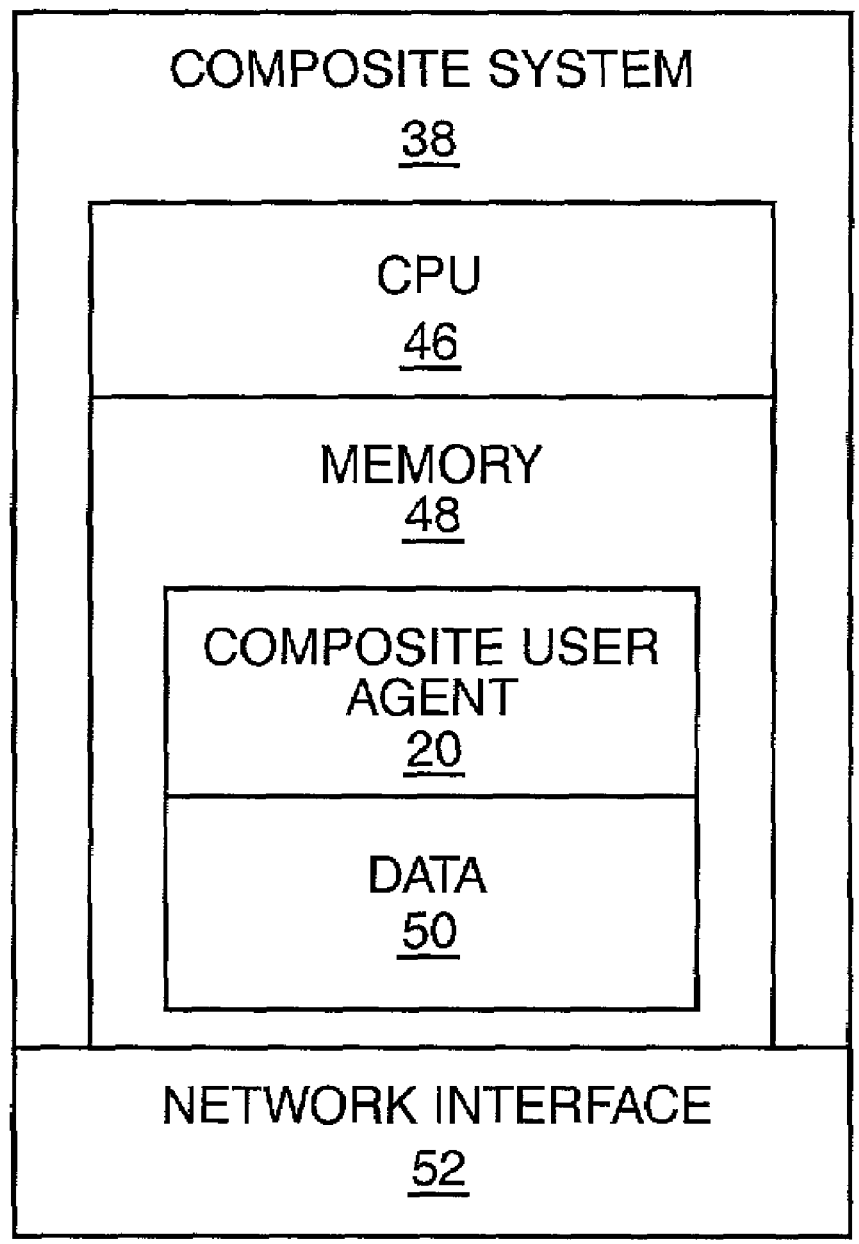
FIG. 7 is a block representation of a composite system capable of implementing a composite user agent according to one embodiment of the present invention.

As illustrated in FIG. 7, a typical composite system 38 may include a central processing unit (CPU) 46 associated with memory 48. The memory 48 would contain the necessary software for implementing a composite user agent 20 and related data 50. A network interface 52 is also associated with the CPU 46 and facilitates packet-switched communications over the SIP network 12.

Those skilled in the art will recognize improvements and modifications to the preferred embodiments of the present invention. All such improvements and modifications are considered within the scope of the concepts disclosed herein and the claims that follow.

What is claimed is:

1. A system for providing a composite user agent for a plurality of devices in a user domain, the system comprising:
   a) an interface facilitating communications; and
   b) a control system associated with the interface and adapted to:
      i) represent the plurality of devices within the user domain as a single user agent to devices outside of the user domain;
      ii) receive an incoming session message associated with initiating a media session;
      iii) determine a media type for the session based on the incoming message;
      iv) identify at least one of the plurality of devices supporting the media type; and
      v) route the incoming session message to the at least one of the plurality of devices supporting the media type.

2. The system of claim 1 wherein the control system is further adapted to route outgoing messages associated with the media session to a device associated with the media session and outside of the user domain.

3. The system of claim 2 wherein the control system is further adapted to route incoming messages from devices outside of the user domain and associated with the media session to the at least one of the plurality of devices supporting the media type.

4. The system of claim 1 wherein the control system is further adapted to route incoming messages from devices outside of the user domain and associated with the media session to the at least one of the plurality of devices supporting the media type.

5. The system of claim 1 wherein the control system is further adapted to register each of the plurality of devices in the user domain and identify media types supported by the plurality of devices.

6. The system of claim 1 wherein the media session requires a first media session for a first media type supported by a first one of the plurality of devices and a second media session for a second media type supported by a second one of the plurality of devices, the control system further adapted to:
   a) determine the first and second media types for the first and second media sessions based on at least one incoming message;
   b) identify the first device supporting the first media type and the second device supporting the second media type; and
   c) route the at least one incoming message to the first device and to the second device.

7. The system of claim 1 wherein the control system is further adapted to:
   a) access a profile identifying a preferred one of at least two of the plurality of devices supporting the media type identified for the media session; and
   b) select the preferred one of the at least two of the plurality of devices supporting the media type identified for the media session, wherein the incoming session message is routed to the preferred one of the at least two of the plurality of devices supporting the media type.

8. The system of claim 1 wherein control system communicates using the session initiation protocol (SIP); the single user agent is a SIP user agent; each of the plurality of the devices includes a SIP agent; and the session message is a SIP message.

9. The system of claim 8 wherein the control system is further adapted to act as a SIP proxy for the SIP user agents of the plurality of devices.

10. A system for providing a composite user agent for a plurality of devices in a user domain, the system comprising:
    a) an interface facilitating communications; and
    b) a control system associated with the interface and adapted to:
       i) represent the plurality of devices within the user domain as a single user agent to devices outside of the user domain;
       ii) act as a proxy for the plurality of devices within the user domain;
       iii) receive incoming session messages associated with session requiring support of a media type; and
       iv) route the incoming session messages to at least one of the plurality of devices supporting the media type.

11. The system of claim 10 wherein the control system is further adapted to determine the media type based on information within at least one of the incoming messages and select the at least one of the plurality of devices based on the media type.

12. A method for providing a composite user agent for a plurality of devices in a user domain, the method comprising:
    a) representing the plurality of devices within the user domain as a single user agent to devices outside of the user domain;
    b) receiving an incoming session message associated with initiating a media session;
    c) determining a media type for the session based on the incoming message;

d) identifying at least one of the plurality of devices supporting the media type; and e) routing the incoming session message to the at least one of the plurality of devices supporting the media type.

13. The method of claim 12 further comprising routing outgoing messages associated with the media session to a device associated with the media session and outside of the user domain.

14. The method of claim 13 further comprising routing incoming messages from devices outside of the user domain and associated with the media session to the at least one of the plurality of devices supporting the media type.

15. The method of claim 12 further comprising routing incoming messages from devices outside of the user domain and associated with the media session to the at least one of the plurality of devices supporting the media type.

16. The method of claim 12 further comprising registering each of the plurality of devices in the user domain and identifying media types supported by the plurality of devices.

17. The method of claim 12 wherein the media session requires a first media session for a first media type supported by a first one of the plurality of devices and a second media session for a second media type supported by a second one of the plurality of devices, the method further comprising:
   a) determining the first and second media types for the first and second media sessions based on at least one incoming message;
   b) identifying the first device supporting the first media type and the second device supporting the second media type; and
   c) routing the at least one incoming message to the first device and to the second device.

18. The method of claim 12 further comprising:
   a) accessing a profile identifying a preferred one of at least two of the plurality of devices supporting the media type identified for the media session; and
   b) selecting the preferred one of the at least two of the plurality of devices supporting the media type identified for the media session, wherein the incoming session message is routed to the preferred one of the at least two of the plurality of devices supporting the media type.

19. The method of claim 12 further comprising communicating using the session initiation protocol (SIP); the single user agent is a SIP user agent; each of the plurality of the devices includes a SIP agent; and the session message is a SIP message.

20. The method of claim 19 further comprising providing a SIP proxy for the SIP user agents of the plurality of devices.

21. A computer readable medium with software for providing a composite user agent for a plurality of devices in a user domain, the software comprising instructions for a computing device to:
   a) represent the plurality of devices within the user domain as a single user agent to devices outside of the user domain;
   b) receive an incoming session message associated with initiating a media session;
   c) determine a media type for the session based on the incoming message;
   d) identify at least one of the plurality of devices supporting the media type; and
   e) route the incoming session message to the at least one of the plurality of devices supporting the media type.

22. The computer readable medium of claim 21 further comprising instructions to route outgoing messages associated with the media session to a device associated with the media session and outside of the user domain.

23. The computer readable medium of claim 22 further comprising instructions to route incoming messages from devices outside of the user domain and associated with the media session to the at least one of the plurality of devices supporting the media type.

24. The computer readable medium of claim 21 further comprising instructions to route incoming messages from devices outside of the user domain and associated with the media session to the at least one of the plurality of devices supporting the media type.

25. The computer readable medium of claim 21 further comprising instructions to register each of the plurality of devices in the user domain and identify media types supported by the plurality of devices.

26. The computer readable medium of claim 21 wherein the media session requires a first media session for a first media type supported by a first one of the plurality of devices and a second media session for a second media type supported by a second one of the plurality of devices, the computer readable medium further comprising instructions to:
   a) determine the first and second media types for the first and second media sessions based on at least one incoming message;
   b) identify the first device supporting the first media type and the second device supporting the second media type; and
   c) route the at least one incoming message to the first device and to the second device.

27. The computer readable medium of claim 21 further comprising instructions to:
   a) access a profile identifying a preferred one of at least two of the plurality of devices supporting the media type identified for the media session; and
   b) select: the preferred one of the at least two of the plurality of devices supporting the media type identified for the media session, wherein the incoming session message is routed to the preferred one of the at least two of the plurality of devices supporting the media type.

28. The computer readable medium of claim 21 further comprising instructions to communicate using the session initiation protocol (SIP); the single user agent is a SIP user agent; each of the plurality of the devices includes a SIP agent; and the session message is a SIP message.

29. The computer readable medium of claim 28 further comprising instructions to provide a SIP proxy for the SIP user agents of the plurality of devices.

* * * * *